US009092950B2

(12) United States Patent
Kemper

(10) Patent No.: US 9,092,950 B2
(45) Date of Patent: Jul. 28, 2015

(54) GAMING MACHINE AND METHODS OF ALLOWING A PLAYER TO PLAY GAMING MACHINES HAVING RETAINED SPECIAL SYMBOLS

(71) Applicant: Konami Gaming, Inc., Las Vegas, NV (US)

(72) Inventor: Roger Kemper, Henderson, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

(21) Appl. No.: 14/092,579

(22) Filed: Nov. 27, 2013

(65) Prior Publication Data

US 2014/0335931 A1 Nov. 13, 2014

(30) Foreign Application Priority Data

Dec. 7, 2012 (AU) ................................ 2012261685

(51) Int. Cl.
*A63F 13/00* (2014.01)
*G07F 17/34* (2006.01)
*G07F 17/32* (2006.01)

(52) U.S. Cl.
CPC .............. *G07F 17/34* (2013.01); *G07F 17/326* (2013.01)

(58) Field of Classification Search
CPC .... G07F 17/32; G07F 17/326; G07F 17/3265
USPC ............................................... 463/16, 20, 21
See application file for complete search history.

(56) References Cited

U.S. PATENT DOCUMENTS

| | | | | |
|---|---|---|---|---|
| 7,396,279 | B2 | 7/2008 | Berman et al. | |
| 7,575,515 | B2 | 8/2009 | Rodgers et al. | |
| 8,197,328 | B2 | 6/2012 | Bluemel | |
| 8,241,107 | B2 | 8/2012 | Moroney | |
| 2002/0002078 | A1 | 1/2002 | Jaffe | |
| 2004/0048646 | A1 | 3/2004 | Visocnik | |
| 2005/0070354 | A1* | 3/2005 | Baerlocher et al. | 463/20 |

(Continued)

FOREIGN PATENT DOCUMENTS

| | | | |
|---|---|---|---|
| AU | 2012202106 | A1 | 5/2012 |

OTHER PUBLICATIONS

Patent Examination Report No. 3 (AU 2012261685)—Date of Issue: Aug. 27, 2014.

(Continued)

*Primary Examiner* — Allen Chan
(74) *Attorney, Agent, or Firm* — Howard & Howard Attorneys PLLC

(57) ABSTRACT

A method of allowing a player to play a gaming machine is described herein. The method includes displaying the game including a plurality of symbols at a plurality of symbol positions including at least one special symbol. A game outcome is randomly generated and displayed. An award is provided to the player if a winning combination is displayed in the generated first game outcome. The method further includes determining if a first special symbol is displayed in the generated first game outcome and responsively retaining the first special symbol during a subsequent second game, generating the second game outcome including the retained first special symbol, determining if a second special symbol is displayed in the second game outcome and responsively releasing the retained first special symbol in a subsequent third game if the second special symbol does not appear in the second game outcome.

20 Claims, 8 Drawing Sheets

(56) References Cited

U.S. PATENT DOCUMENTS

| | | | |
|---|---|---|---|
| 2005/0164774 A1 | 7/2005 | Gauselmann | |
| 2006/0264254 A1* | 11/2006 | Aoki | 463/20 |
| 2007/0155474 A1 | 7/2007 | Gauselmann | |
| 2008/0167113 A1 | 7/2008 | Plowman | |
| 2008/0234030 A1 | 9/2008 | Layton | |
| 2009/0227339 A1 | 9/2009 | Kim | |
| 2009/0227356 A1 | 9/2009 | Moroney | |
| 2010/0029365 A1 | 2/2010 | Roukis | |
| 2010/0075737 A1* | 3/2010 | Bluemel | 463/20 |
| 2010/0222127 A1 | 9/2010 | Finch | |
| 2010/0317426 A1 | 12/2010 | Bond et al. | |
| 2011/0111829 A1 | 5/2011 | Joung | |
| 2012/0040737 A1 | 2/2012 | Roukis | |

OTHER PUBLICATIONS

Patent Examination Report No. 1—Date of Issue Oct. 23, 2013.

Patent Examination Report No. 2 (AU2012261685)—Date of Issue Jan. 13, 2014.

* cited by examiner

GAMING MACHINE AND METHODS OF ALLOWING A PLAYER TO PLAY GAMING MACHINES HAVING RETAINED SPECIAL SYMBOLS

CROSS-REFERENCE TO RELATED APPLICATION

This application claims priority to Australian Patent Application No. 2012261685, filed Dec. 7, 2012, the disclosure of which is hereby incorporated by reference in its entirety.

TECHNICAL FIELD

The subject matter disclosed herein relates generally to gaming machines and more particularly, to an apparatus and method for allowing players to play gaming machines having retained special symbols.

BACKGROUND OF THE INVENTION

At least some known gaming machines include a video display device to display a reel-type slot game that includes a plurality of reels, wherein each reel includes a plurality of symbols. During game play, the gaming machine accepts a wager from a player, the player selects one or more paylines, the gaming machine spins the reels, and sequentially stops each reel to display the generated combination of symbols on the reels. The gaming machine then awards the player an award based on the combination of symbols orientated along the selected payline. At least some known gaming machines generate game outcomes that may include special symbols that are indicative of potential enhanced awards and provide an enhanced award if a winning combination includes the special symbols. Known gaming machines now also spin each reel to display new combinations of symbols for each game played.

Because known gaming machines display new combinations of symbols for each generated game, the player may become frustrated because a special symbol that is displayed in a game outcome is not available for subsequent game plays. Accordingly, new features are necessary to appeal to player interest and enhance excitement in order to entice longer play and increased profitability. The present invention is directed to satisfying these needs.

SUMMARY OF THE INVENTION

In one aspect of the present invention, a method of allowing a player to play a gaming machine is provided. The method includes displaying, on a display device, the game including a plurality of symbols at a plurality of symbol positions. The plurality of symbols including a plurality of normal symbols and at least one special symbol. The method also includes randomly generating an outcome of a first game and displaying the generated first game outcome on the display device and providing an award to the player if a winning combination is displayed in the generated first game outcome. The method further includes determining if a first special symbol is displayed in the generated first game outcome and responsively retaining the first special symbol during a subsequent second game, generating the second game outcome including the retained first special symbol, determining if a second special symbol is displayed in the second game outcome and responsively releasing the retained first special symbol in a subsequent third game and generating the third game outcome that does not include the first special symbol if the second special symbol does not appear in the second game outcome.

In another aspect of the present invention, a gaming machine is provided. The gaming machine includes a display device, a user input device configured to generate a signal indicative of a player's selection input, and a controller coupled to the display device and the user input device for displaying a game including a plurality of symbols at a plurality of symbol positions, wherein the plurality of symbols includes a plurality of normal symbols and at least one special symbol. The controller receives a signal indicative of a wager on the game, responsively generates an outcome of a first game, and displays the generated first game outcome on the display device. The controller also determines if a first special symbol is displayed in the generated first game outcome and responsively retaining the first special symbol during a subsequent second game, generates the second game outcome including the retained first special symbol, determines if a second special symbol is displayed in the second game outcome and responsively releases the retained first special symbol in a subsequent third game and generates the third game outcome that does not include the first special symbol if the second special symbol does not appear in the second game outcome.

In yet another aspect of the present invention, a gaming system is provided. The gaming system includes a plurality of gaming devices and a system controller that is coupled to each gaming device. Each gaming device includes a user input device for accepting a player's selection input and a display device. The system controller is configured to display, on at least one gaming device, a game including a plurality of symbols at a plurality of symbol positions, wherein the plurality of symbols includes a plurality of normal symbols and at least one special symbol. The system controller receives a signal indicative of a wager on the game, responsively generates an outcome of a first game and displays the generated first game outcome on the gaming device. The system controller also determines if a first special symbol is displayed in the generated first game outcome and responsively retaining the first special symbol during a subsequent second game, generates the second game outcome including the retained first special symbol, determines if a second special symbol is displayed in the second game outcome and responsively releases the retained first special symbol in a subsequent third game and generates the third game outcome that does not include the first special symbol if the second special symbol does not appear in the second game outcome.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE INVENTION

Figure 1:
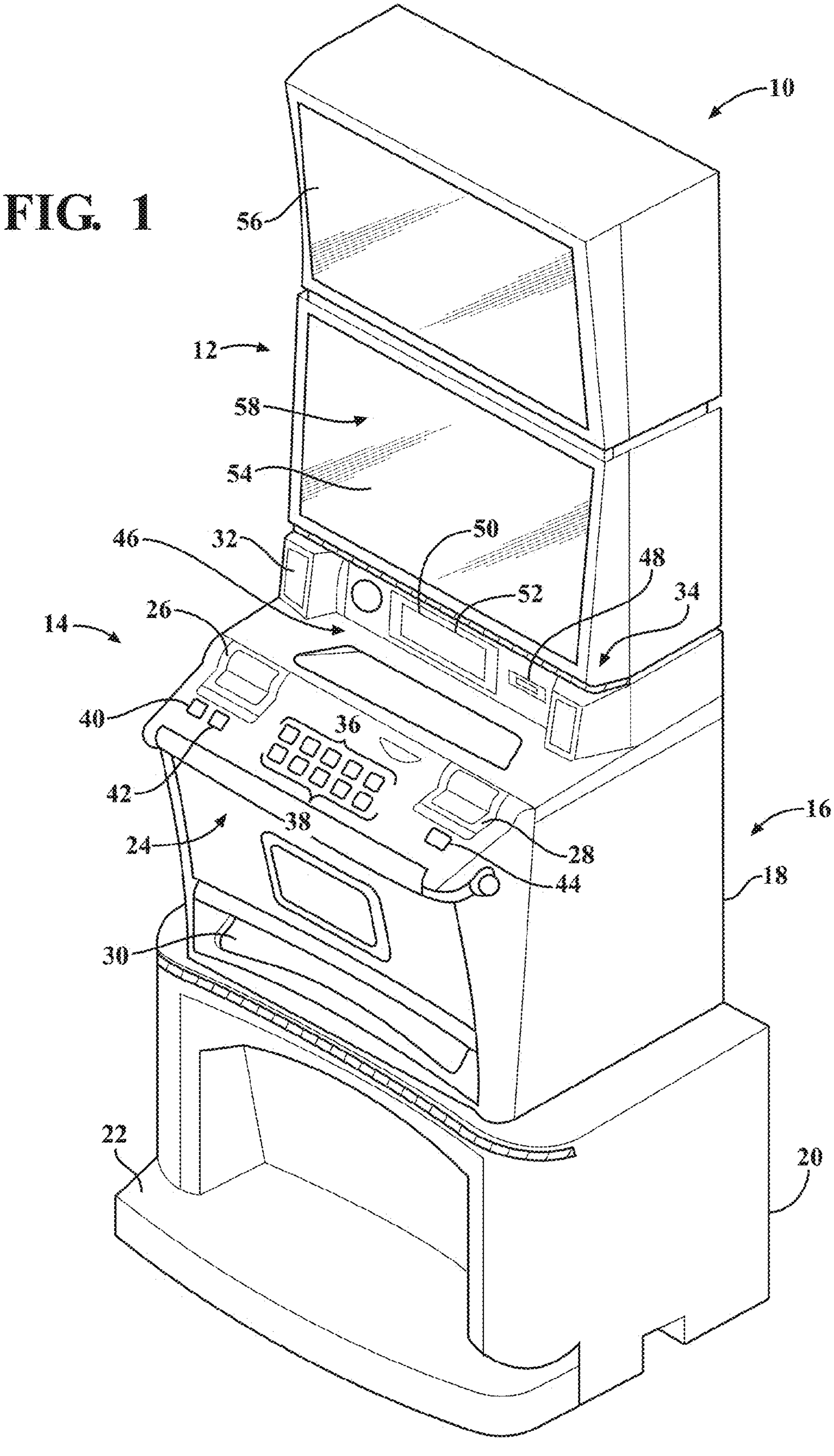
FIG. 1 is a perspective view of an exemplary gaming machine of the present invention.

With reference to the drawings and in operation, the present invention overcomes at least some of the disadvantages of known gaming machines by providing a gaming machine 10 that selectively retains special symbols for use in subsequent games to facilitate increasing a player's expectation of achieving a winning combination in the subsequent games. More specifically, the gaming machine determines if a first special symbol is displayed in an outcome of a first game and retains the special symbol in a predefined symbol position for use in subsequently played games. Moreover, the gaming machine determines if a second special symbol is displayed in a subsequent second game and retains the first and second special symbols for use in a subsequent game outcome. In addition, the gaming machine releases the special symbols if another special symbol does not appear in the subsequent game. By providing a gaming machine that selectively retains special symbols for use in subsequent games, the player's expectation for achieving a win is increased and the enjoyment of the game is improved. Thus, the amount of time that the game is played by patrons of a gaming establishment is thereby increased.

In general, the gaming machine 10 allows a player to initiate a gaming session to play a plurality of slot games via the gaming machine 10. The gaming machine 10 displays a game, accepts a wager on the game, generates a first game outcome including a plurality of symbols at a plurality of symbol positions, and provides an award to the player if a winning combination is displayed in the generated first game outcome. The gaming machine 10 also determines if a special symbol is displayed in the generated first game outcome and retains the special symbol for use in subsequent games. More specifically, during play of a subsequent second game, the gaming machine 10 moves the special symbol to a predefined symbol position, retains the special symbol in the predefined symbol position, and randomly generates a subsequent second game outcome that includes the special symbol being retained in the predefined symbol position. The gaming machine 10 displays the generated second game outcome including the special symbol positioned in the predefined symbol position and provides an award to the player based on a winning outcome in the second game outcome. In addition, the gaming machine 10 may provide an enhanced award such as, for example, an award bonus multiplier, if the winning outcome includes the special symbol. The gaming machine 10 also determines if a second special symbol is displayed in the second game outcome and retains both special symbols in predefined symbol positions during a subsequent third game. If a second special symbol does not appear in the second game outcome, the gaming machine 10 releases the retained special symbol such that the special symbol is not used in the subsequent third game.

In the illustrated embodiment, the gaming machine 10 allows a player to play a plurality of slot games having an outcome display that includes a 5×3 reel arrangement including 5 reels and 3 symbols displayed per reel. The gaming machine 10 allows a player to initiate a gaming session, displays a slot game, accepts a wager on the slot game, generates an outcome of the slot game, and awards the player an award if the slot game outcome is a winning outcome. The gaming machine 10 also allows a player to play a primary game and awards the player one or more bonus games i.e., secondary games, based at least in part on the generated outcome of the primary game. The secondary game may include a plurality of free spins, wherein the gaming machine 10 displays the outcome of each bonus game consecutively, without requiring the player to initiate play of each bonus game. Alternatively, the gaming machine 10 may require the player to initiate each bonus game, i.e., press a spin button, before displaying a subsequent bonus game outcome.

During play of the bonus games, the gaming machine 10 generates an outcome of a first bonus game, spins and stops the slot reels to display the first bonus game outcome, and provides the player an award based on the generated first bonus game outcome. The gaming machine 10 determines if a first special symbol is displayed in the first bonus game outcome, and retains the first special symbol for display in at least one subsequently played bonus game. In one embodiment, the gaming machine 10 determines if the first special symbol is displayed in a predefined reel such as, for example, the $4^{th}$ reel in the first game outcome and partially rotates the $4^{th}$ reel to move the first special symbol to a predefined symbol position on a display grid. The gaming machine 10 rotates and stops the remaining reels to display the second bonus game outcome in the display grid including the first special symbol being retained in the predefined symbol position.

In the illustrated embodiment, the gaming machine 10 may assign an award multiplier function to the first special symbol for use in the second game outcome. For example, if a winning outcome of the second game includes the first special symbol, the gaming machine 10 multiplies an award for achieving the winning outcome by the first special symbol multiplier function. In addition, the gaming machine 10 modifies the first special symbol image to indicate the assigned multiplier function.

The gaming machine 10 may also determine if a second special symbol is displayed in the second game outcome, and releases the first special symbol if a second special symbol is not displayed in the second game outcome such that the first special symbol is not retained in subsequent bonus game outcomes. More specifically, gaming machine 10 does not retain the first special symbol for display in a third bonus game outcome, such that each reel is spun and stopped to display the third bonus game outcome. In addition, if a second special symbol is displayed in the second bonus game outcome, the gaming machine 10 retains the first and second special symbols for display in the subsequent third bonus game outcome. In one embodiment, the gaming machine 10 determines if the second special symbol is displayed in a second predefined reel such as, for example, the $2^{nd}$ reel in the second bonus game outcome and retains the second special symbol in the subsequent third game if the second special symbol is displayed in the $2^{nd}$ reel. During display of the third game outcome, the gaming machine 10 partially rotates the $2^{nd}$ reel to move the second special symbol to a second predefined position in the display grid, and spins and stops the remaining reels, i.e., the $1^{st}$, $3^{rd}$, and $5^{th}$ reels, to display the subsequent third game outcome including the first and second special symbols retained in the predefined symbol positions. In one embodiment, the second special symbol is moved such that the first and second special symbols are aligned along the same payline. In another embodiment, the second special symbol is moved such that the second special symbol is adjacent to the first special symbol in the display grid.

In addition, the gaming machine 10 may also assign an award multiplier function to the second special symbol for use in the third game outcome, such that an award provided to the player for achieving a winning combination that includes the first special symbol and the second special symbol is multiplied by the first special symbol multiplier function and multiplied by the second special symbol multiplier function. The gaming machine 10 also modifies the second special symbol image to indicate the assigned multiplier function. In one embodiment, the gaming machine 10 assigns the first and second special symbols the same multiplier function such as, for example, a 2× award multiplier, in the third bonus game outcome. Alternatively, the gaming machine 10 may assign different multiplier functions to each of the first and second special symbols.

During a subsequent third bonus game, the gaming machine 10 may determine if a third special symbol is displayed in third bonus game outcome. If the third special symbol is not displayed in the third game outcome, the gaming machine 10 releases the first and second special symbols such that the first and second symbols are not retained in a subsequent fourth bonus game outcome. If the third special symbol is displayed in the third bonus game outcome, the gaming machine 10 partially rotates the third predefined reel that includes the third special symbol such as, for example, the center $3^{rd}$ reel to move the third special symbol to a third predefined symbol position within the display grid. The gaming machine 10 retains the first, second, and third special symbols in the predefined positions and spins and stops the remaining reels, i.e., the $1^{st}$ and $5^{th}$ reel, to display the subsequent fourth bonus game outcome including the retained first, second, and third special symbols. In addition, the gaming machine 10 assigns a multiplier function to the third special symbol and provides a player an award that is multiplied by the first special symbol multiplier function, the second special symbol multiplier function, and the third special symbol multiplier function. Moreover, the gaming machine 10 modifies the third special symbol image to indicate the assigned multiplier function. In one embodiment, the gaming machine 10 releases each special symbol after a predefined number of special symbols have been retained in the previous bonus games.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 2:
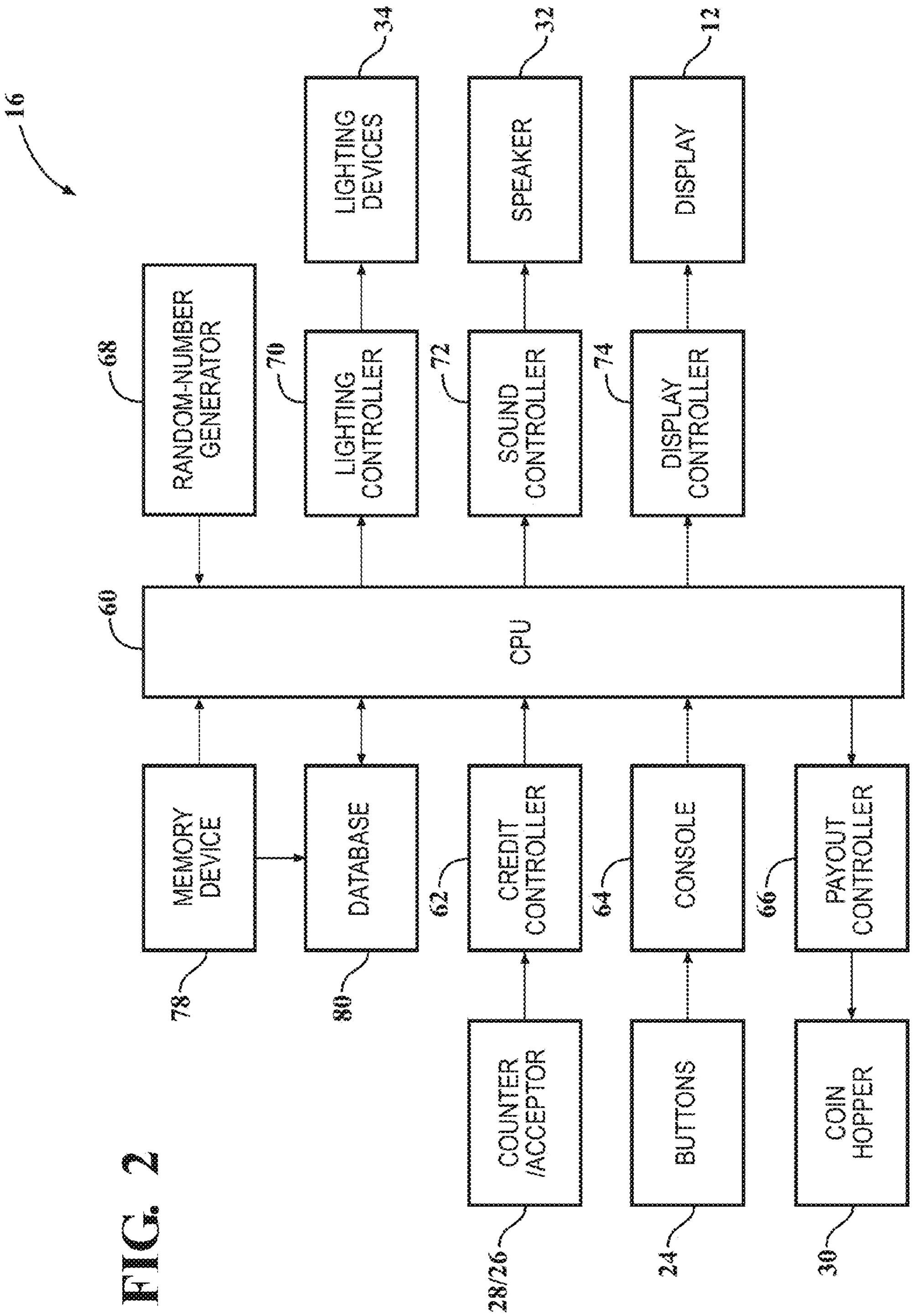
FIG. 2 is a schematic representation of the gaming machine shown in FIG. 1.

FIG. 1 is a perspective view of an exemplary gaming machine 10. FIG. 2 is a schematic representation of the gaming machine 10. The illustrated embodiment of the present invention is a video gaming machine preferably installed in a casino. In the illustrated embodiment, the gaming machine 10 includes a display device 12 for displaying a plurality of games, a user input device 14 to enable a player to interface with the gaming machine 10, and a gaming controller 16 that is operatively coupled to the display device 12 and the user input device 14 to enable a player to play games displayed on the display device 12. The gaming machine 10 may also include a cabinet assembly 18 that is configured to support the display device 12, the user input device 14, and/or the gaming controller 16 from a gaming stand 20 and/or a supporting surface 22.

The display device 12 and the user input device 14 are each coupled to the cabinet assembly 18 and are each accessible by the player. In one embodiment, the gaming controller 16 is positioned within the cabinet assembly 18. Alternatively, the gaming controller 16 may be separated from the cabinet assembly 18, and connected to components of the gaming machine 10 through a network such as, for example, a local area network (LAN), a wide area network (WAN), dial-in-connections, cable modems, wireless modems, and/or special high-speed Integrated Services Digital Network (ISDN) lines.

In one embodiment, the user input device 14 includes a plurality of input buttons 24, a coin slot 26, and/or a bill acceptor 28. The coin slot 26 includes an opening that is configured to receive coins and/or tokens deposited by the player into the gaming machine 10. The gaming machine 10 converts a value of the coins and/or tokens to a corresponding amount of gaming credits that are used by the player to wager on games played on the gaming machine 10.

The bill acceptor 28 includes an input and output device that is configured to accept a bill, a ticket, and/or a cash card into the bill acceptor 28 to enable an amount of gaming credits associated with a monetary value of the bills, ticket, and/or cash card to be credited to the gaming machine 10. Moreover, the gaming machine 10 may also utilize a cashless wagering system (not shown), such as a ticket in ticket out (TITO) system (not shown). In one embodiment, the bill acceptor 28 also includes a printer (not shown) that is configured to dispense a printed voucher ticket that includes information indicative of an amount of credits and/or money paid out to the player by the gaming machine 10 during a gaming session. The voucher ticket may be used at other gaming machines, or redeemed for cash, and/or other items as part of a casino cashless system (not shown).

A coin tray 30 is coupled to the cabinet assembly 18 and is configured to receive a plurality of coins that are dispensed from the gaming machine 10. One or more speakers 32 are installed inside the cabinet assembly 18 to generate voice announcements and/or sound effects associated with game play. The gaming machine 10 may also include one or more lighting devices 34 that are configured to blink and/or change brightness and color in specific patterns to produce lighting effects to enhance a visual gaming experience for the player.

In one embodiment, the input buttons 24 include a plurality of BET switches 36 for inputting a wager on a game, a plurality of selection switches 38 for selecting a betting line and/or card, a MAXBET switch 40 for inputting a maximum wager, a PAYOUT switch 42 for ending a gaming session and dispensing accumulated gaming credits to the player, and a start button, i.e., a SPIN/DEAL button 44 to initiate an output of a game.

In the illustrated embodiment, the BET switches 36 include five switches from 1BET to 5BET to enable a player to wager between a minimum bet up to 5× minimum bet. Each selection switch 38 corresponds to a betting line such as, for example, a payline and/or symbol for a reel game, one or more cards for a card game, and/or a symbol for a roulette game, to enable a player to associate a wager with one or more betting lines. The MAXBET switch 40 enables a player to input the maximum bet that a player can spend against one time of a game. The PAYOUT switch 42 enables a player to receive the amount of money and/or credits awarded to the player during a gaming session, which has been credited onto the gaming machine 10.

The gaming machine 10 may also include a player tracking device 46 that is coupled to the gaming controller 16 for identifying the player and/or a player tracking account that is associated with the player. The player tracking account may include, but is not limited to, gaming credits available to the player for use in playing the gaming machine 10. The player tracking device 46 is configured to communicate player account information between a player tracking controller (not shown) and the gaming machine 10. For example, the player tracking device 46 may be used to track bonus points and/or credits awarded to the player during a gaming session and/or track bonus and/or credits downloaded to the gaming machine 10 from the player tracking system.

The player tracking device 46 is coupled to the gaming cabinet assembly 18 and includes a player identification card reader 48, a data display 50, and a keypad 52. The player identification card reader 48 is configured to accept a player tracking card (not shown) inserted by the player, and read information contained on the player tracking card to identify the player account information. The player identification card reader 48 may include, but is not limited to, a barcode reader, a magnetic card reader, and/or a radio frequency identification (RFID) card reader. The keypad 52 is configured to accept a user selection input such as, for example, a unique player personal identification number (PIN) to facilitate enabling the gaming machine 10 to identify the player, and access player account information associated with the identified player to be displayed on the data display 50. In one embodiment, the data display 50 includes a touchscreen panel that includes the keypad 52. Alternatively, the data display 50 and the keypad 52 may be included in the display device 12.

In one embodiment, the display device 12 includes a first display 54 and a second display 56. The first display 54 is configured to display a game screen 58 (shown in FIG. 3) including indicia and/or symbols for use in a game, e.g., cards used by a card game, roulette wheel and symbols used in a roulette game, and reels used in a reel game. The game screen 58 may include any type of game including, but not limited to, a video slot game, a keno game, a blackjack game, a video poker game, or any type of game which allows a player to make a wager, play a game, and potentially provide the player an award based on an outcome of the game and a paytable. The second display 56 is configured to display game play instructions for performing the game including, but not limited to, playing instructions, paytables, paylines, betting lines and/or any other information to enable the gaming machine 10 to function as described herein.

Moreover, each display 54 and 56 may be configured to display at least a portion of the game screen 58 and/or game play instructions. In one embodiment, the first and second displays 54 and 56 each include a flat panel display, such as a cathode ray tube display (CRT), a liquid crystal display (LCD), a light-emitting diode display (LED), a plasma display, and/or any suitable visual output device capable of displaying graphical data and/or text to a user. Alternatively, a single component, such as a touch screen, may function as both the display device 12 and as the user input device 14. In an alternative embodiment, the first display 54 and/or the second display 56 includes a plurality of mechanical reels displaying a plurality of game symbols.

Referring to FIG. 2, in one embodiment, the gaming controller 16 includes a processor, i.e., a central processing unit (CPU) 60, a credit controller 62, a console unit 64, a payout controller 66, a random-number generator (RNG) 68, a lighting controller 70, a sound controller 72, a display controller 74, a memory device 78, and a database 80. Memory device 78 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 60 to store, retrieve, and/or execute instructions and/or data.

The CPU 60 executes various programs, and thereby controls other components of the gaming controller 16 according to player instructions and data accepted by the user input device 14. The CPU 60 in particular executes a game program, and thereby conducts a game in accordance with the embodiments described herein. The memory device 78 stores programs and databases used by the CPU 60. Moreover, the memory device 78 stores and retrieves information in the database 80 including image data for producing game images and screens on the display device 12, and temporarily stores variables, parameters, and the like that are used by the CPU 60. In addition, the memory device 78 stores indicia, symbol weights, paytables, and/or winning combination tables which represent relationships between combinations of random numbers and types of awards. In one embodiment, the memory device 78 utilizes RAM to temporarily store programs and data necessary for the progress of the game, and EPROM to store, in advance, programs and data for controlling basic operation of the gaming machine 10, such as the booting operation thereof.

The credit controller 62 manages the amount of player's credits, which is equivalent to the amount of coins and bills counted and validated by the bill acceptor 28. The console unit 64 is coupled to the user input device 14 to monitor player selections received through the input buttons 24, and accept various instructions and data that a player enters through the input buttons 24. The payout controller 66 converts a player's credits to coins, bills, or other monetary data by using the coin tray 30 and/or for use in dispensing a credit voucher via the bill acceptor 28.

The lighting controller 70 controls one or more lighting devices 34 to blink and/or change brightness and color in specific patterns in order to produces lighting effects associated with game play. The sound controller 72 controls the speakers 32 to output voice announcements and sound effects during game play. The display controller 74 controls the display device 12 to display various images on screens preferably by using computer graphics and image data stored in the memory device 78. More specifically, the display controller 74 controls video reels in a game screen displayed on the first display 54 and/or the second display 56 by using computer graphics and the image data.

The RNG 68 generates and outputs random numbers to the CPU 60 preferably at the start of each round of game. The CPU 60 uses the random numbers to determine an outcome of the primary and secondary games. For example, if the primary game is a video slot game, the CPU 60 uses the RNG 68 to randomly select an arrangement of symbols to be displayed on video reels. Moreover, the CPU 60 generally uses random numbers generated by the RNG 68 to play the primary and secondary games, and to determine whether or not to provide an award to a player. In addition, the CPU 60 generates game outcomes including combinations of random numbers, and compares the generated combinations with winning combinations stored in the winning combination table to determine if the generated outcome is a winning outcome that is associated with a type of award.

Figure 3:
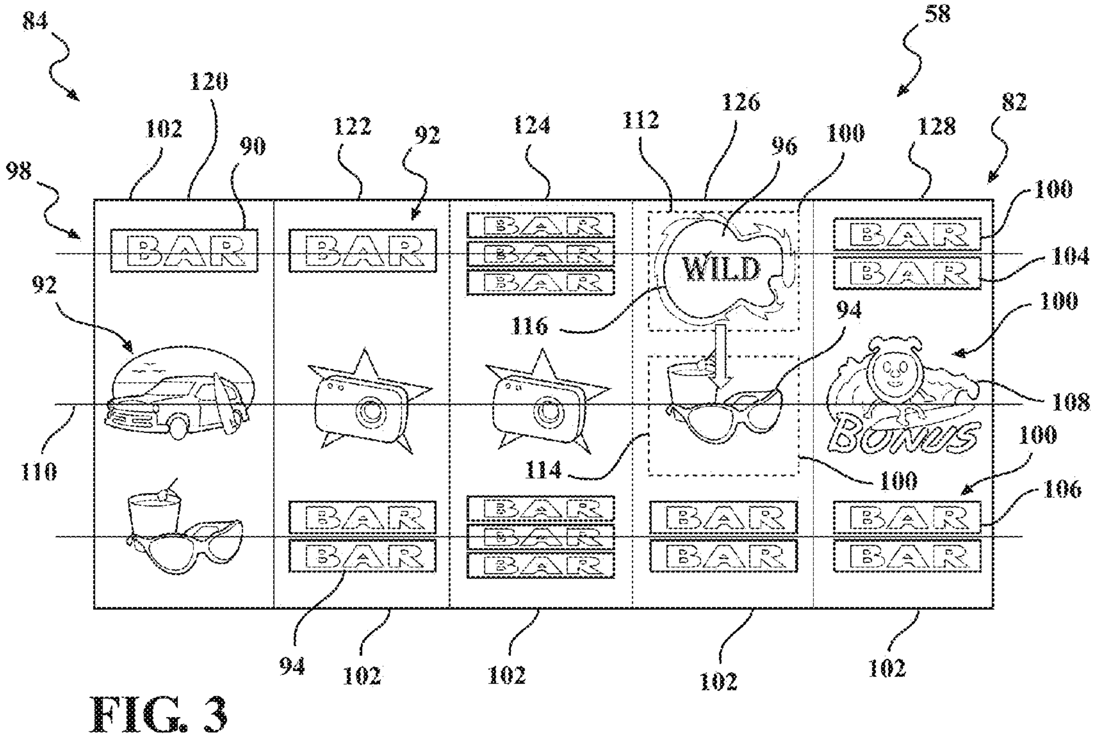
FIG. 3 is a first graphical display of a slot game, according to an embodiment of the present invention.
Figure 4:
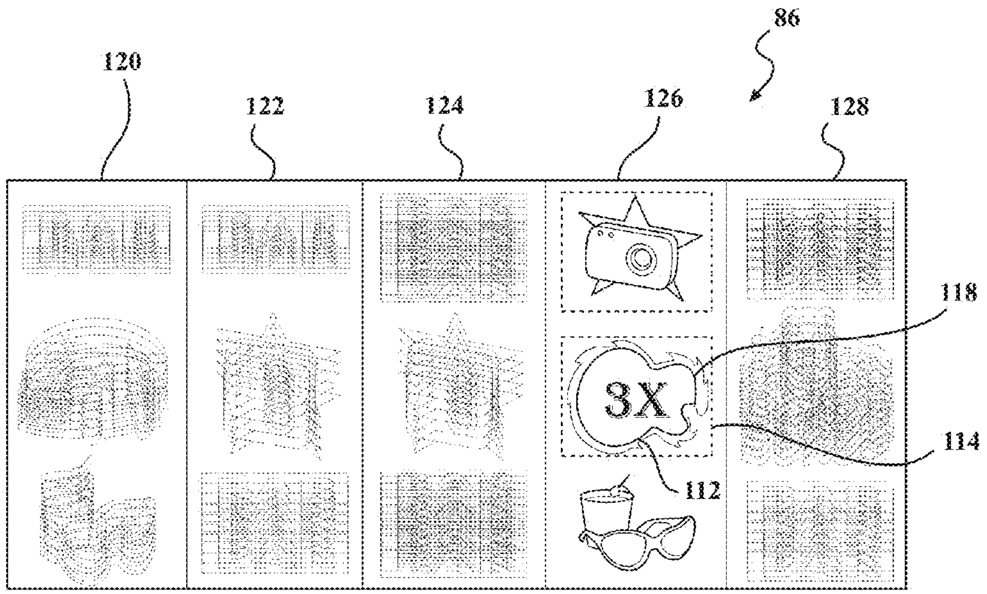
FIG. 4 is a second graphical display of the slot game of FIG. 3, according to an embodiment of the present invention.

FIG. 3 is an exemplary graphical display of a game 82 that is displayed by gaming machine 10. FIGS. 4-8 are graphical displays of the game 82 including a first game outcome 84 (shown in FIG. 3), a second game outcome 86 (shown in FIG. 5), a third game outcome 88 (shown in FIG. 7), and a partial fourth game outcome 89. The gaming controller 16 is configured to display the game 82 on the display device 12. In one embodiment, the game 82 is a video slot game. In other embodiments, the gaming machine 10 may include a plurality of mechanical reels including a video overlay and/or a plurality of video displays coupled to the mechanical reels. However, it should be noted that the game 82 may be any type of game upon which a player could make a wager including, but not limited to, a keno game, a blackjack game, a video poker game, or any type of game that enables the gaming machine 10 to function as described herein. In the illustrated embodiment, the game 82 is displayed on the first display 54. Alternatively, the game 82 may be displayed on the first display 54 and/or the second display 56.

In general, during play of the game 82, the gaming controller 16 randomly selects a plurality of game symbols 90 from a predefined set of possible game symbols to be displayed on the display device 12. Each game symbol 90 has one or more symbol images 92 associated with the game symbol 90. The symbol image 92 may be, for example, a graphic image, a letter, a number, a word, a shape, a sound and/or any combination thereof. In the illustrated embodiment, the predefine set of possible game symbols includes a plurality of normal symbols 94 and one or more special symbols 96. In one embodiment, the special symbols 96 may represent any other normal symbol 94 and/or any game value in a generated game outcome that enables the gaming machine 10 to function as described herein. For example, the special symbol 96 may be a "Wild" symbol that may be substituted with any normal symbol 94 in a symbol combination to generate a winning combination. Moreover, in some embodiments, the special symbols 96 may be indicative of an award multiplier that increases a credit and/or monetary award associated with a winning outcome by a predefined multiplier factor, wherein the gaming machine 10 provides an enhanced award if the special symbol 96 is included in the winning combination. The special symbol 96 may indicate award multipliers equal to a multiplier factor of 2×, 3×, and/or 4× the award, and/or any suitable award multiplier factor. In some embodiments, the special symbol 96 is indicative of other types of awards, including, prizes, e.g., meals, show tickets, and/or free games.

In the illustrated embodiment, the gaming controller 16 displays the game 82 including a plurality of game symbols 90 that are displayed in a grid 98 having a plurality of cells, i.e., symbol positions, represented by phantom line 100, defined by rows and/or columns. In the illustrated embodiment, the gaming controller 16 displays the game symbols 90 within a plurality of columns, i.e., reels 102. The game 82, in one embodiment, includes 5 reels 102 with 3 symbol positions 100 per reel 102 (a "3×5" arrangement). In the illustrated embodiment (shown in FIGS. 3-8), each reel 102 includes three symbol positions 100, i.e., an upper position 104, a lower position 106 orientated below the upper position 104, and a middle position 108 orientated between the upper position 104 and the lower position 106 such that a central payline 110 extends across each middle position 108. Alternatively, other reel arrangements may be used such as, for example, 4, 5, 5, 5, and 4 cells per reel, respectively (a "4-5-5-5-4" arrangement), 3-4-3-4-3, or 4-5-4-5-4 arrangements or arrangements with the same number of cells per column, such as 3×3, 3×4, 4×5, or 5×5 configurations. In one embodiment, the gaming machine 10 displays the game 82 via a plurality of mechanical reels (not shown) that include a plurality of symbols displayed on a circumferential surface of each reel.

Each slot game is generally played in a conventional manner. The player makes a wager, which may be based on a predetermined denomination and a selected number of paylines, and the gaming controller 16 randomly generates an outcome for the game, spins the reels, and selectively stops the reels to display a game symbol 90 in each of the symbol positions 100. If a predetermined pattern of symbols 90 are randomly chosen for each symbol position 100 on a played payline, the player may be awarded a payout based on the payline, the wager, and a predetermined paytable. Moreover, the player may be awarded a payout if the combination of symbols associated with a selected payline is a winning combination. In addition, a player may receive a bonus feature and/or a bonus game based on the combination of symbols associated with the selected payline and/or the appearance of one or more special symbols 96 in the game outcome. Many variations to the above described general play of a slot game fall within the scope of the present invention. Such slot games are well-known in the art, and are therefore not further discussed.

In the illustrated embodiment, the gaming machine 10 receives a signal, from the user input device 14, that is indicative of a player's selection to initiate a gaming session including a wager amount, and a selection of one or more paylines associated with a predefined set of cells 100 within the displayed grid 98. In the illustrated embodiment, the gaming machine 10 is a multi-line game, i.e., the paylines include horizontal paylines and/or diagonal pay-lines, and/or zig-zag paylines. Moreover, the user input device 14 may allow the player to toggle to increase the bet per payline a credit at a time (up to the maximum bet). The gaming controller 16 randomly generates an outcome of the game 82, and displays the generated outcome on the display device 12. In one embodiment, the gaming controller 16 is configured to rotate, and/or spin each reel 102 to initiate a game play, and stop each reel 102 to display a plurality of symbols associated with the randomly generated outcome. In addition, the gaming controller 16 is adapted to determine if the generated outcome is a winning outcome based on the displayed game symbols 90, a pay-table, a wager, and one or more selected paylines. More specifically, the gaming machine 10 determines if a combination of symbols 90 arranged along the selected payline is a winning combination. The gaming controller 16 may provide an award in response to the outcome of the game 82. In general, the term "award" may be a payout, in terms of credits or money. Thus, gaming controller 16 may award a regular payout in response to the outcome of the primary game 82. However, it should be noted that the term award may also refer to other types of awards, including, prizes, e.g., meals, show tickets, etc. . . . , as well as in-game award, such as free games or awarding the player one or more wild symbols or stacked wild symbols in each of the games.

In the illustrated embodiment, the gaming controller 16 generates an outcome 84 of a first game 82 (shown in FIG. 3) and displays the generated first game outcome 84 on the display device 12. The gaming controller 16 determines if the generated first game outcome 84 includes a winning combination of displayed symbols 90 and provides an award to the player if a winning combination is displayed in the generated first game outcome 84.

Figure 5:
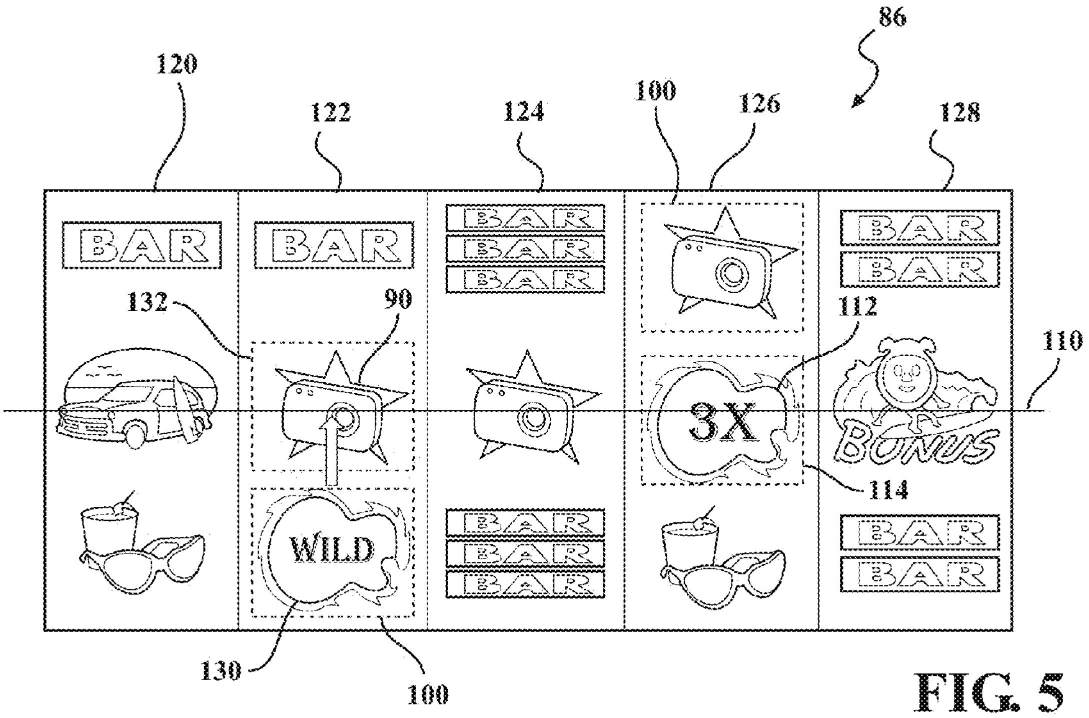
FIG. 5 is a third graphical display of the slot game of FIG. 3, according to an embodiment of the present invention.
Figure 6:
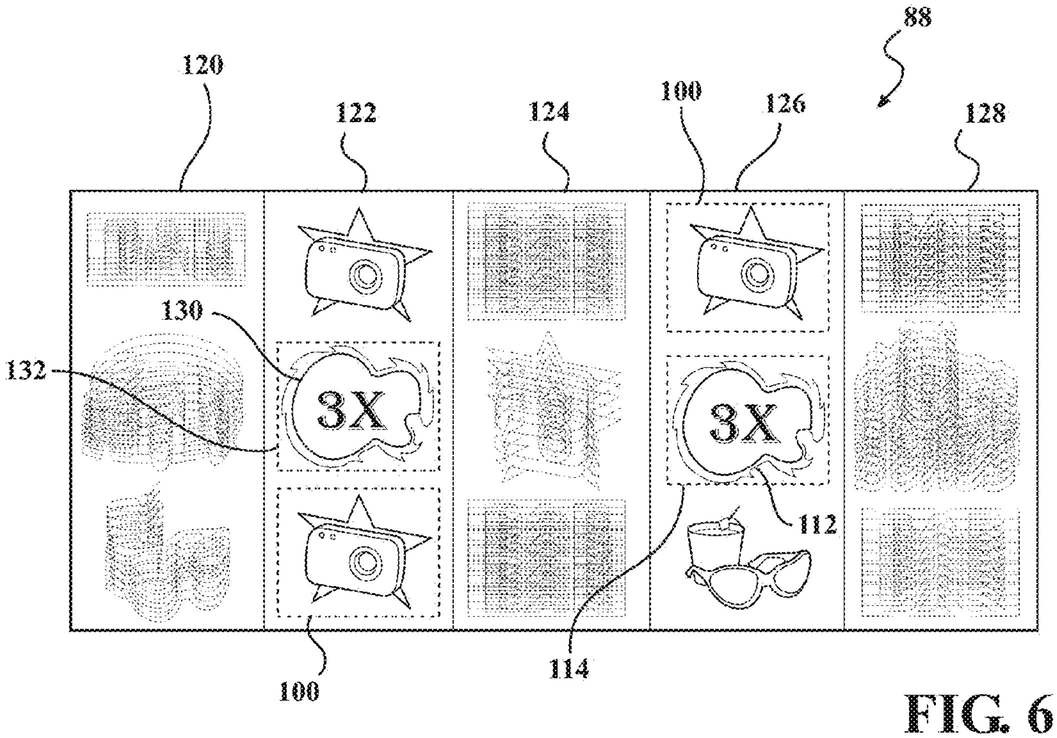
FIG. 6 is a fourth graphical display of the slot game of FIG. 3, according to an embodiment of the present invention.

The gaming controller 16 determines if a first special symbol 112 is displayed in the generated first game outcome 84, and retains the first special symbol 112 during a subsequent second game outcome 86 (shown in FIG. 5). More specifically, the gaming controller 16 randomly generates an outcome of the second game 82 including the first special symbol 112 and displays the generated second game outcome 86 including the retained first special symbol 112.

During display of the generated second game outcome 86, the gaming controller 16 spins the reels 102 such that the first special symbol 112 is retained in a corresponding symbol position 100, and stops the reels 102 to display the second game outcome 86 including the first special symbol 112. In one embodiment, during the display of the second game outcome 86, the gaming controller 16 does not spin the reel 102 that includes the first special symbol 112 such that the position of each symbol 90 in the special symbol reel 102 is retained in the corresponding symbol positions 100. Alternatively, the first special symbol 112 may be displayed as an overlay symbol image such that each the normal symbol 94 within the special symbol reel 102 passes through, over, and/or underneath the first special symbol 112 as the reel 102 is rotated.

In the illustrated embodiment, during, or prior to, the presentation of the second game outcome 86 (shown in FIG. 4), the gaming machine 10 moves, or "nudges", the first special symbol 112 to a predefined symbol position, i.e., a first predefined symbol position 114, and displays the second game outcome 86 including the first special symbol 112 displayed in the first predefined symbol position 114. More specifically, during, or prior to, display of the second game outcome 86, the gaming controller 16 partially rotates the reel 102 that includes the first special symbol 112 to move the first special symbol 112 to the first predefined symbol position 114, and stops the rotation of the reel 102 to retain the first special symbol 112 in the first predefined symbol position 114. The gaming controller 16 also spins each reel 102 that does not contain the first special symbol 112, and stops each reel 102 to display the second game outcome 86 including the first special symbol 112 retained in the first predefined symbol position 114.

In one embodiment, the first predefined symbol position 114 is orientated along the central payline 110. Alternatively, the first predefined symbol position 114 may be any symbol position 100 displayed in the game outcome.

In the illustrated embodiment, the gaming controller 16 may also assign a first multiplier function to the first special symbol 112 and generate the second game outcome 86 including the first special symbol 112 having the first multiplier function. In one embodiment, the first multiplier function is indicative of a 2× multiplier factor. The gaming controller 16 determines if the generated second game outcome includes a winning combination that includes the first special symbol 112, and provides an enhanced award if the winning combination includes the first special symbol 112. In one embodiment, the gaming controller 16 provides an enhanced award that is indicative of the first special symbol multiplier function. For example, the gaming controller 16 may provide an enhanced award that is equal to the award for achieving the winning combination multiplied by the first multiplier function.

The gaming controller 16 also selectively displays the first special symbol 112 with one of a plurality of symbol images 92. Moreover, the gaming controller 16 selectively displays the first special symbol 112 having a symbol image 92 that is indicative of the assigned multiplier function. In one embodiment, the gaming controller 16 displays the first game outcome 84 including the first special symbol 112 having a first symbol image 116 that is indicative of a "Wild" symbol, i.e., a symbol that may represent any other normal symbol 94 in a generated game outcome. During display of the second game outcome 86, the gaming controller 16 modifies the symbol image 92 of the first special symbol 112 from the first symbol image 116 to a second symbol image 118 (shown in FIG. 4) that is indicative of the assigned multiplier function such as, for example, a symbol including a "3×" graphic that is indicative of a 3× multiplier function associated with the first special symbol 112.

In the illustrated embodiment, the gaming controller 16 is configured to retain the first special symbol 112 if the first special symbol 112 appears in a predefined reel. For example, the gaming controller 16 displays the game 82 having five reels 102 orientated horizontally including a $1^{st}$ reel 120, a $2^{nd}$ reel 122, a $3^{rd}$ reel 124, a $4^{th}$ reel 126, and a $5^{th}$ reel 128. The gaming controller 16 determines if the first special symbol 112 is displayed in a predefined reel such as, for example the $4^{th}$ reel 126, and retains the first special symbol 112 in the second game outcome 86 if the first special symbol 112 is displayed in the predefined $4^{th}$ reel 126. Moreover, during display of the second game outcome 86, the gaming controller 16 partially spins and stops the $4^{th}$ reel 126 to move the first special symbol 112 to the first predefined symbol position 114. In addition, in one embodiment, the gaming controller 16 does not retain the first special symbol 112 if the first special symbol 112 is not displayed in the predefined $4^{th}$ reel 126 in the first game outcome 84.

Figure 7:
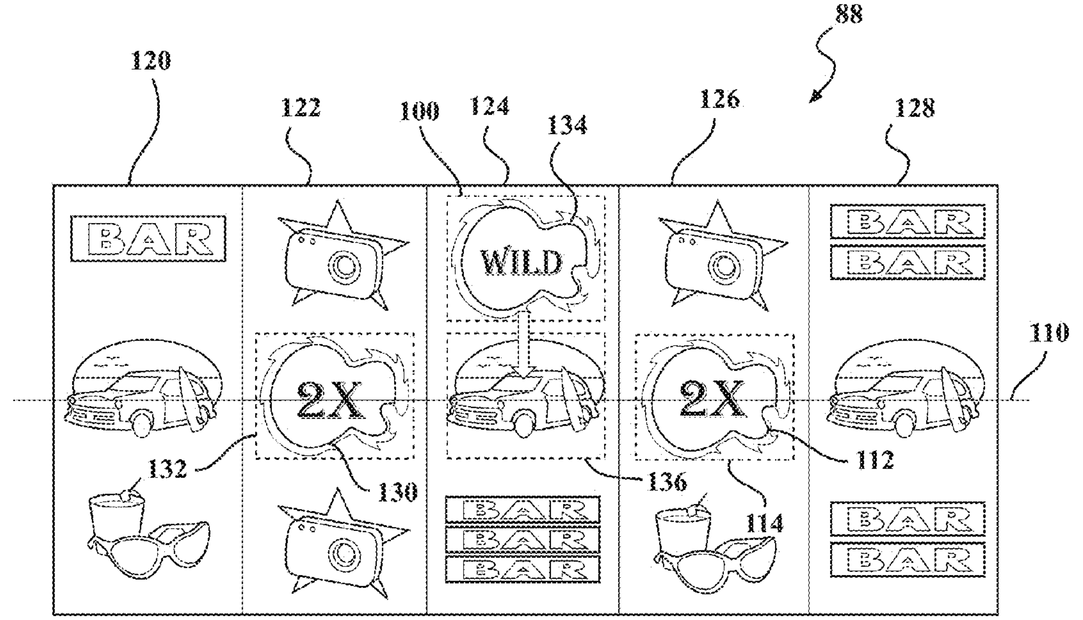
FIG. 7 is a fifth graphical display of the slot game of FIG. 3, according to an embodiment of the present invention.

In the illustrated embodiment, the gaming controller 16 determines if a second special symbol 130 is displayed in the second game outcome 86 and retains the first special symbol 112 and the second special symbol 130 in a subsequent third game outcome 88 (shown in FIG. 7).

Moreover, if the second special symbol 130 does not appear in the second game outcome 86, the gaming controller 16 releases the first special symbol 112 from the predefined symbol position 114, and rotates each reel 102 to display the subsequent third game outcome 88.

If the second special symbol 130 appears in the second game outcome 86, the gaming controller 16 generates the third game outcome 88 including the first special symbol 112 and the second special symbol 130 and displays the subsequent third game outcome 88 including the retained first special symbol 112 and the retained second special symbol 130. During display of the third game outcome 88 (shown in FIG. 6), the gaming controller 16 moves the second special symbol 130 to a second predefined symbol position 132 and displays the third game outcome 88 including the second special symbol 130 displayed in the second predefined symbol position 132. In the illustrated embodiment, the second predefined symbol position 132 is orientated with respect to the first predefined symbol position 114 such that the first and second special symbols 112 and 130 are aligned along a predefined payline such as, for example the central payline 110.

In one embodiment, the gaming controller 16 retains the first and second special symbols 112 and 130 if the second special symbol 130 is displayed in a second predefined reel, i.e., the $2^{nd}$ reel 122, and releases the first and second special symbols 112 and 130 if the second special symbol 130 is not displayed in the $2^{nd}$ reel 122 in the second game outcome 86.

During display of the third game outcome 88, the gaming controller 16 assigns a multiplier function to each of the first special symbol 112 and second special symbol 130, and awards the player an enhanced award if a winning combination in the third game outcome 88 includes the first and second special symbols 112 and 130. In one embodiment, the enhanced award is equal to an award for achieving the winning outcome multiplied by the first special symbol multiplier function and multiplied by the second special symbol multiplier function. In addition, the gaming controller 16 modifies the symbol image 92 of the second special symbol 130 and/or the first special symbol 112 from the "Wild" symbol to a symbol that is indicative of the assigned multiplier function. In one embodiment, the gaming controller 16 assigns the first special symbol 112 and the second special symbol 130 the same multiplier function. Alternatively, the gaming controller 16 may assign different multiplier functions. Moreover, the gaming machine 10 may modify the symbol images of the first and second special symbols 112 and 130 to indicate the assigned multiplier functions. In addition, the gaming controller 16 may assign multiplier functions that are equal to the number of special symbols 96 displayed in the game outcome.

Figure 8:
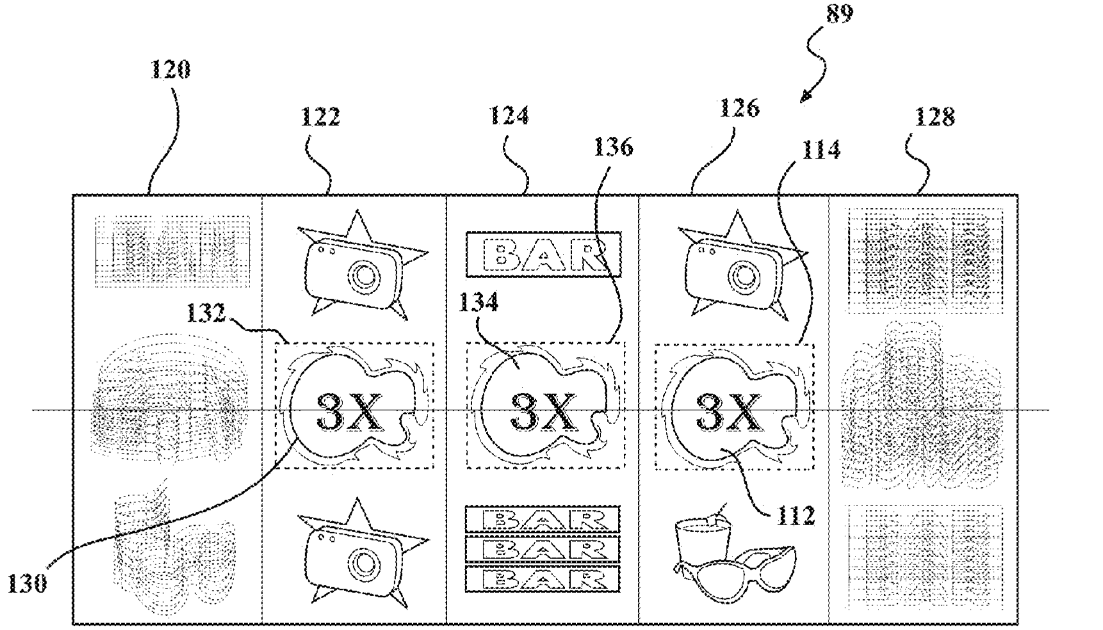
FIG. 8 is a sixth graphical display of the slot game of FIG. 3, according to an embodiment of the present invention.

In the illustrated embodiment, the gaming controller 16 determines if a third special symbol 134 appears in the third game outcome 88, and retains the first, second, and third special symbols 112, 130, and 134 for use in generating a subsequent fourth game outcome 89 (shown in FIG. 8). If the third special symbol 134 is displayed in the third game outcome 88, the gaming controller 16 partially rotates the reel 102 having the third special symbol 134 to move the third special symbol 134 to a third predefined symbol position 136. In one embodiment, the third special symbol 134 is moved to a position that is aligned with the first and second special symbols 112 and 130 along the predefined payline 110. The gaming controller 16 then displays the fourth game outcome 89 including the retained first, second, and third special symbols 112, 130, and 134. In addition, the gaming controller 16 assigns a multiplier function to the third special symbol 134 for use in the fourth game outcome, and provides an enhanced award based on the assigned multiplier functions. Moreover, the gaming controller 16 modifies the symbol image of the third special symbol 134 to indicate the assigned multiplier function. In one embodiment, the gaming controller 16 retains the special symbols 112, 130, and 134 if the third special symbol 134 appears in a third predefined reel, i.e., the $3^{rd}$ reel 124, and releases the first and second special symbol 112 and 130 if the third special symbol 134 does not appear in the $3^{rd}$ reel 124. In addition, the gaming controller 16 may release each first, second, and third special symbols 112, 130, and 134 if a predefined number of special symbols 96 have been retained in a previous game outcome and/or are displayed in a current game outcome. In addition, in one embodiment, the gaming controller 16 may retain each special symbol 96 displayed in a game outcome for use in subsequent game outcomes until a predefined number of special symbols 96 have been retained, and/or until each reel 102 includes a retained special symbol 96.

Figure 9:
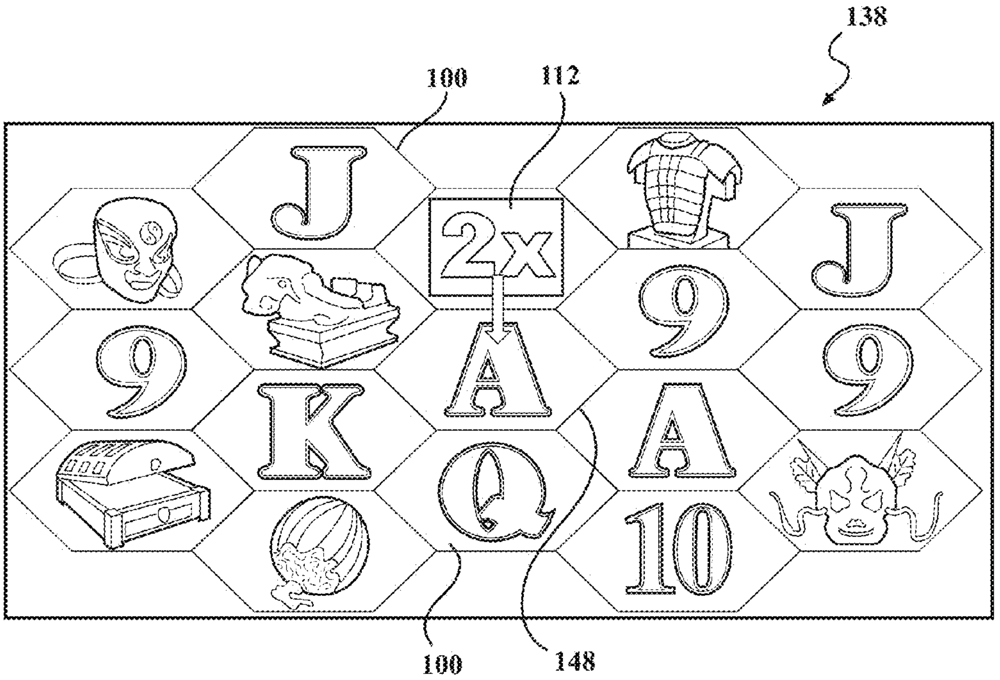
FIG. 9 is a first graphical display of another embodiment of a slot game, according to an embodiment of the present invention.
Figure 10:
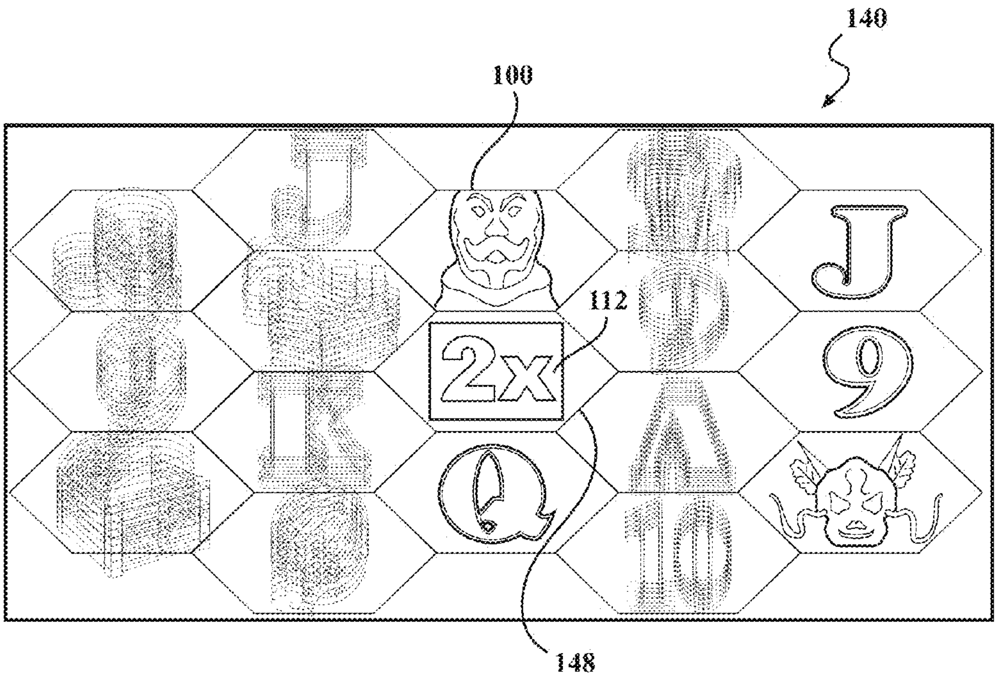
FIG. 10 is a second graphical display of the slot game of FIG. 9, according to an embodiment of the present invention.
Figure 11:
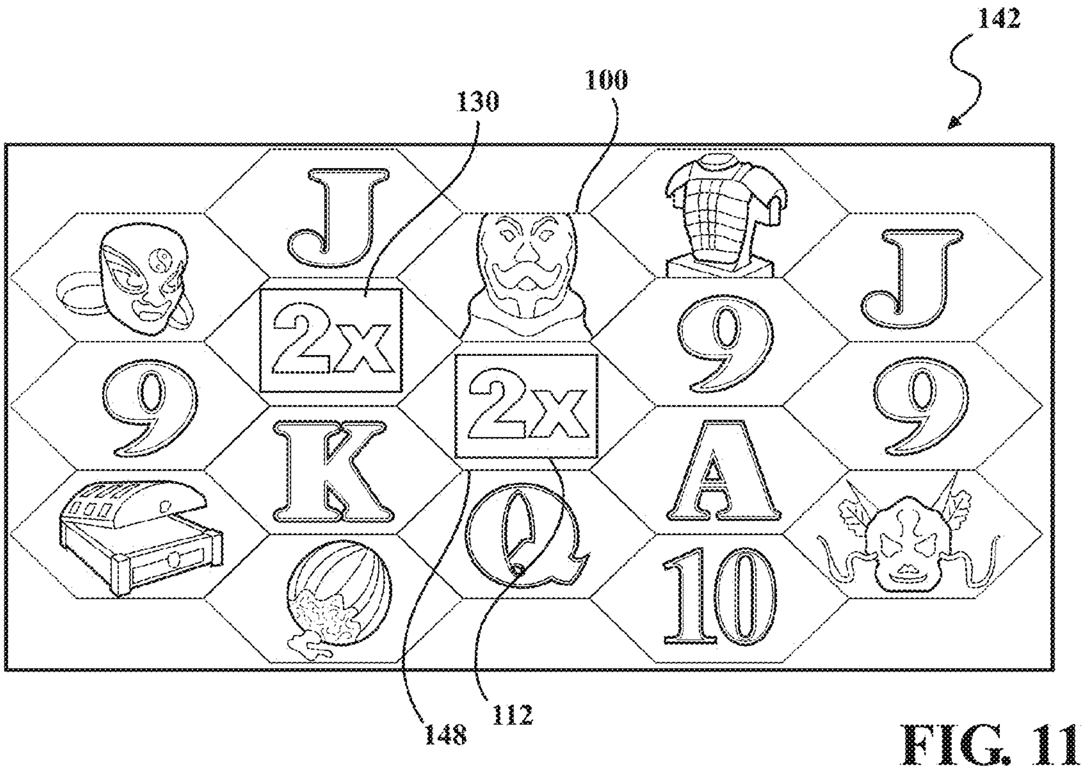
FIG. 11 is a third graphical display of the slot game of FIG. 9, according to an embodiment of the present invention.
Figure 12:
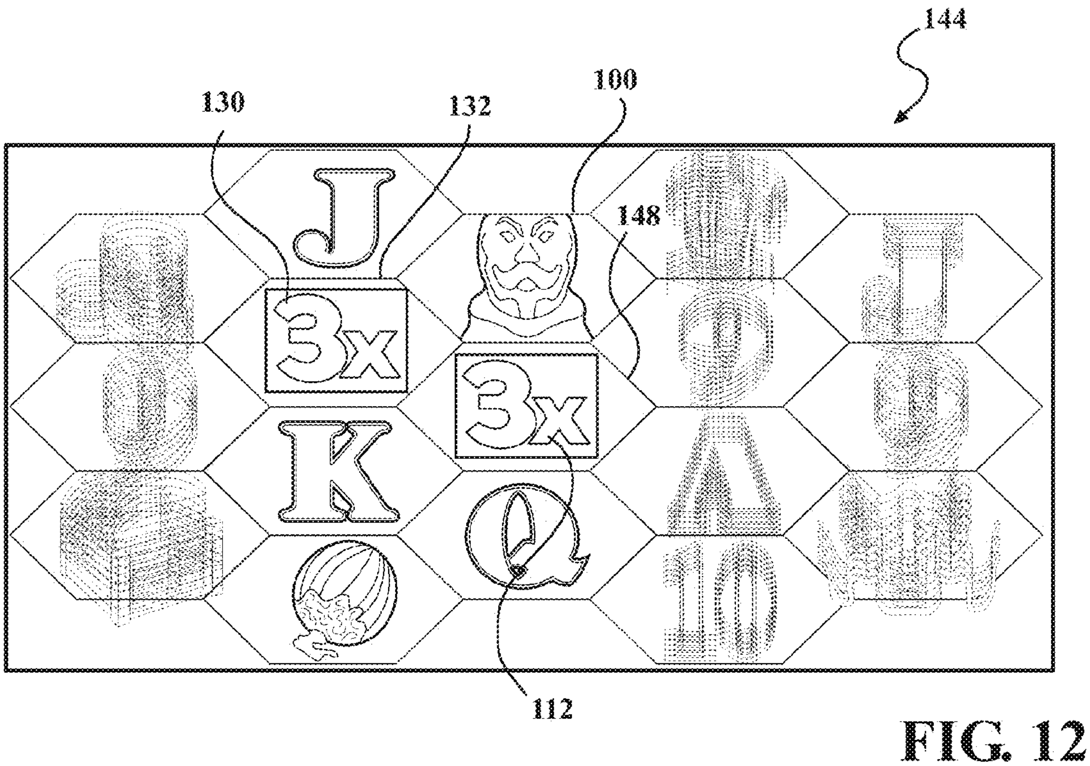
FIG. 12 is a fourth graphical display of the slot game of FIG. 9, according to an embodiment of the present invention.

FIG. 9 is an exemplary graphical display of another game 138 that is displayed by gaming machine 10. FIGS. 10-12 are graphical displays of the game 138 including a first game outcome 140 (shown in FIG. 10), a second game outcome 142 (shown in FIG. 11), and a partial third game outcome 144 (shown in FIG. 12). In the illustrated embodiment, the gaming controller 16 displays the game 138 having a plurality of symbol positions 100 orientated in a game display having a honeycomb shape, wherein winning combinations may include combinations of adjacent symbols. Each symbol position 100 includes a hexagonal shape and is orientated adjacent two or more symbol positions 100. In addition, game 138 is displayed having a central symbol position 148 that includes adjacent symbols positions 100 on each side of the central symbol position 148.

During play of the game 138, the gaming controller 16 determines if the first special symbol 112 is displayed in the generated first game outcome 140, and retains the first special symbol 112 during a subsequent second game outcome 142 (shown in FIG. 11). Moreover, the gaming controller 16 moves the first special symbol 112 to a first predefined symbol position such as, for example, the central symbol position 148 during display of the second game outcome 142. The gaming controller 16 may also determine if a second special symbol 130 is displayed in the second game outcome 142 and retains the first and second special symbols 112 and 130 during a subsequent third game outcome 144 (shown in FIG. 12). In the illustrated embodiment, during display of the third game outcome 144, the gaming controller 16 moves the second special symbol 130 to a second predefined symbol position 132 that is adjacent to the central symbol position 148. In one embodiment, the gaming controller 16 retains the first and second special symbols 112 and 130 if, during the second game outcome, the second special symbol 130 is displayed in the adjacent second predefined position 132. In the illustrated embodiment, the gaming controller 16 retains each special symbol 96 for use in subsequent game outcomes until a predefined number of special symbols 96 have been retained. In addition, the gaming controller 16 releases each special symbol 96 if an additional special symbol 96 does not appear in a subsequent game outcome. Moreover, the gaming controller 16 may release each retained special symbol 96 if an additional special symbol 96 does not appear in a predefined symbol position in the subsequent game outcome, for example, a symbol position that is adjacent the first predefined symbol position 114 and/or the second predefined symbol position 132.

Figure 13:
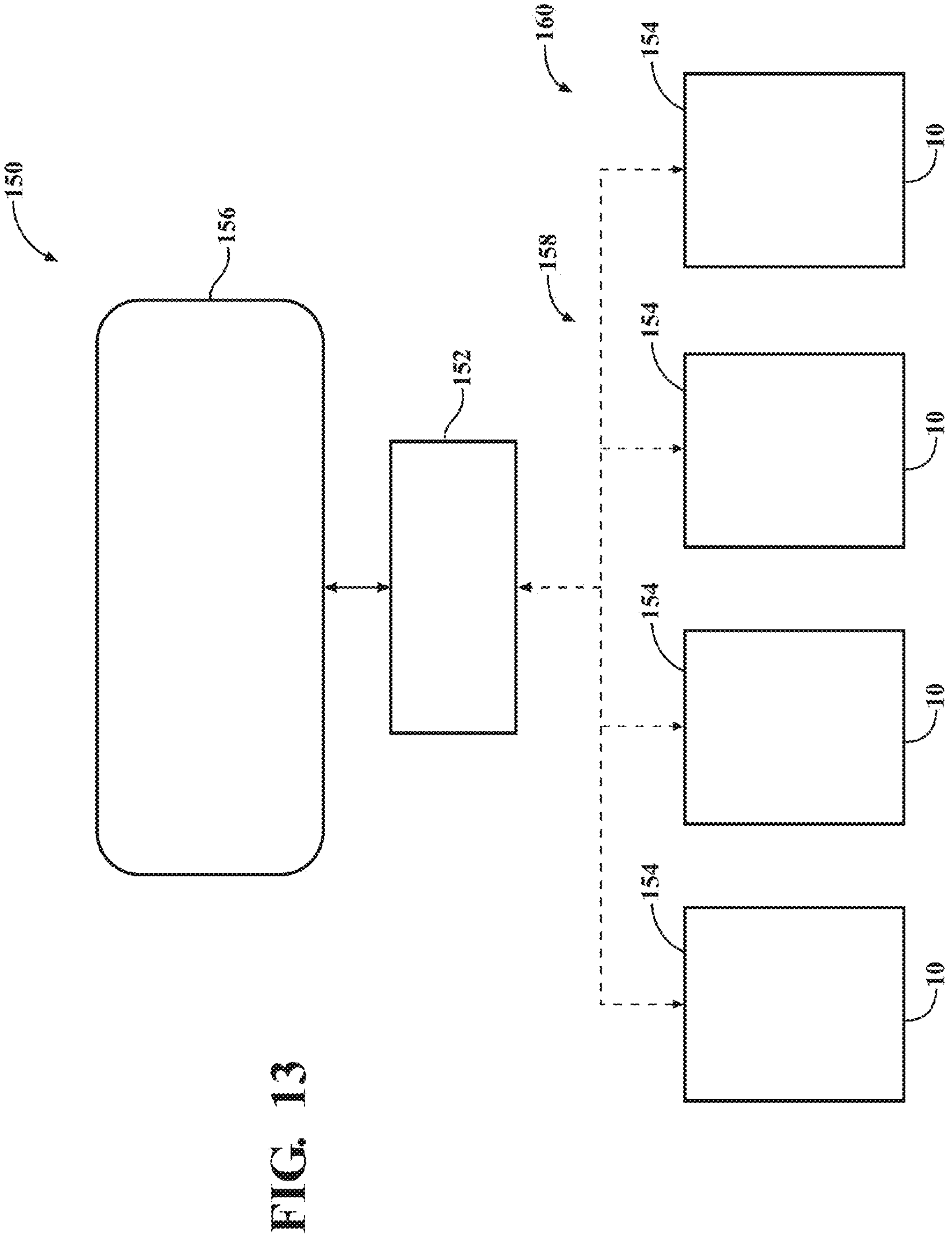
FIG. 13 is a schematic view of an exemplary gaming system of the present invention.

FIG. 13 is a schematic view of an exemplary gaming system 150. The gaming system 150 includes a system controller 152 and one or more gaming terminal devices 154 that are coupled to the system controller 152 that is coupled to each gaming terminal 10. The gaming system 150 may also include a central display 156 that is coupled to the system controller 152 for displaying games played on one or more of the gaming machines 154. In one embodiment, the gaming terminal 154 includes the gaming machine 10. In another embodiment, gaming terminal 154 may include a personal computer, laptop, cell phone, smartphone, tablet computer, personal data assistant, and/or any suitable computing device that enables a player to connect to system controller 152 to play the game 82.

In the illustrated embodiment, the gaming machines 10 and the system controller 152 are coupled in communication with a local area network (LAN) 158. Alternatively, the gaming machines 10 and the system controller 152 may be coupled via a network such as, for example, an Internet link, an intranet, a WAN, dial-in-connections, cable modems, wireless modems, and/or ISDN lines. In the illustrated embodiment, the gaming system 150 includes four gaming machines 10, which in one embodiment as shown in FIG. 13 are arranged in a bank 160, i.e., are arranged together, adjacently. It should be noted, however, that the gaming system 150 may include any number of gaming machines 10 that may be arranged in any manner, such as in a circle or along a curved arc, or positioned within separate areas of a casino floor, and/or separate gaming establishments such as different casinos. Furthermore, additional groups of gaming machines 10 may be coupled to the system controller 152. In one embodiment, the system controller 152 may be implemented by one of the gaming controllers 16 associated with a gaming machine 10. In still another embodiment, the system controller 152 may be located remotely with respect to gaming machines 10, or within one of the gaming machine cabinet assemblies 18

(shown in FIG. 1). The system controller 152 is configured to perform all of the functions of the gaming controller 16 as described herein.

In the illustrated embodiment, the system controller 152 determines if a triggering event occurs in a game outcome being played at one or more of the gaming machines 10, and displays a bonus game such as, for example, the game 82 on the central display 156 if the triggering event occurs. Alternatively, the system controller 152 may display the game 82 at one or more gaming machines 10 based on one or more triggering events occurring in games played at the gaming machines 10. The triggering event may be the appearance of a predefined symbol and/or a predefined symbol combination in a game outcome.

During play of the bonus game 82, the system controller 152 determines a number of game outcomes, i.e., free spins that will be displayed based at least in part on the triggering event. The system controller 152 generates the first game outcome 84, determines if the first special symbol 112 is displayed in the generated first game outcome 84, and retains the first special symbol 112 for use in the subsequent second game outcome 86, and moves the first special symbol 112 to the predefined symbol position 114 during display of the subsequent second game outcome 86. The system controller 152 may also determine if one or more second special symbols 130 appear in the second game outcome 86 and retain the first and second special symbols 112 and 130 for use in the subsequent third game outcome 88. In one embodiment, the system controller 152 retains each special symbol 96 if an additional special symbol 96 appears in the next game outcome. Alternatively, the system controller 152 may release each special symbol 96 after a predefined number of special symbols have been retained.

For each game outcome, the system controller 152 provides an enhanced award to the player in the winning outcomes includes the special symbols 96.

The above-described systems and methods overcome at least some disadvantages of known gaming machines by providing a gaming machine that determines if a first special symbol is displayed in an outcome of a first game, and retains the special symbol in a predefined symbol position for use in subsequently played games. Moreover, the gaming machine determines if a second special symbol is displayed in a subsequent second game and retains the first and second special symbols for use in a subsequent game outcome. In addition, the gaming machine releases the special symbols if another special symbol does not appear in the subsequent game. By providing a gaming machine that selectively retains special symbols for use in subsequent games, the player's expectation for achieving a winning combination is increased. Thus the enjoyment of a game is improved and the amount of time that the game is played by patrons of a gaming establishment is thereby increased.

Exemplary embodiments of a gaming machine and methods of allowing a player to play gaming machines having retained special symbols are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media.

Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspect and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method of allowing a player to play a gaming machine, comprising the steps of:

displaying, on a display device, a game including a plurality of symbols at a plurality of symbol positions, the plurality of symbols including a plurality of normal symbols and at least one special symbol;

randomly generating an outcome of a first game and displaying the generated first game outcome on the display device;

providing an award to the player if a winning combination is displayed in the generated first game outcome;

determining if a first special symbol is displayed in the generated first game outcome, responsively retaining the first special symbol during a subsequent second game, assigning a first multiplier factor to the first special symbol and generating the second game outcome including the retained first special symbol; and determining if a second special symbol is displayed in the second game outcome and responsively releasing the retained first special symbol in a subsequent third game if the second special symbol does not appear in the second game outcome and retaining the first and the second special symbols in the subsequent third game and assigning a second multiplier factor to the second special symbol if the second special symbol appears in the second game outcome.

2. A gaming machine, comprising:

a display device;

a user input device configured to generate a signal indicative of a player's selection input; and a controller coupled to the display device and the user input device, the controller for displaying, on the display device, a game including a plurality of symbols at a plurality of symbol positions, the plurality of symbols including a plurality of normal symbols and at least one special symbol, for receiving, from the user input device, a signal indicative of a wager on the game, for responsively generating an outcome of a first game and display the generated first game outcome on the display device, for determining if a first special symbol is displayed in the generated first game outcome, responsively retaining the first special symbol during a subsequent second game, assigning a first multiplier factor to the first special symbol, and generating the second game outcome including the retained first special symbol, and for determining if a second special symbol is displayed in the second game outcome and responsively releasing the retained first special symbol in a subsequent third game if the second special symbol does not appear in the second game outcome and retaining the first and the second special symbols in the subsequent third game and assigning a second multiplier factor to the second special symbol if the second special symbol appears in the second game outcome.

3. The gaming machine of claim 2, the controller for:

displaying the first special symbol with one of a plurality of symbol images indicative of the assigned multiplier function; and providing an enhanced award to the player if the second game outcome includes a winning outcome including the first special symbol, the enhanced award being a function of the first special symbol multiplier function.

4. The gaming machine of claim 2, the controller for:

moving the first special symbol to a predefined symbol position; and retaining the first special symbol in the predefined position and responsively randomly generating the subsequent second game outcome including the first special symbol being retained in the predefined symbol position.

5. The method of claim 1 further comprising the steps of randomly generating the subsequent third game outcome including the first special symbol and the second special symbol and providing another award to the player as a function of the third game outcome.

6. The method of claim 1, wherein the first special symbol is retained in a first predefined symbol position, the method further comprises the steps of:

moving the second special symbol to a second predefined symbol position; and generating the third game outcome including the first special symbol being retained in the first predefined symbol position and the second special symbol being retained in the second predefined position.

7. The method of claim 6, further comprising the step of moving the second special symbol to the second predefined symbol position such that the second special symbol is adjacent to the first special symbol.

8. The method of claim 6, wherein the game includes a plurality of paylines extending across the plurality of symbol positions, the method further comprises the steps of:

moving the first special symbol to the first predefined symbol position along a predefined payline; and moving the second special symbol to the second predefined symbol position along the predefined payline such that the predefined payline extends across the first and second special symbols.

9. The method of claim 6, further comprising the steps of:

assigning the same multiplier function value to each of the first special symbol and the second special symbol; and providing an enhanced award to the player if the third game outcome includes a winning outcome including the first and second special symbols, the enhanced award being a function of the first special symbol multiplier function and the second special symbol multiplier function.

10. The method of claim 6, the controller for releasing the first and second special symbols in a subsequent forth game outcome if a third special symbol is not displayed in the third game outcome.

11. The gaming machine of claim 2, the controller for randomly generating the subsequent third game outcome including the first special symbol and the second special symbol and providing another award to the player as a function of the third game outcome.

12. The gaming machine of claim 2, wherein the first special symbol is retained in a first predefined symbol position, the controller for moving the second special symbol to a second predefined symbol position, and for generating the third game outcome including the first special symbol being retained in the first predefined symbol position and the second special symbol being retained in the second predefined position.

13. The gaming machine of claim 12, the controller for moving the second special symbol to the second predefined symbol position such that the second special symbol is adjacent to the first special symbol.

14. The gaming machine of claim 12, wherein the game includes a plurality of paylines extending across the plurality of symbol positions, the controller for moving the first special symbol to the first predefined symbol position along a predefined payline, and for moving the second special symbol to the second predefined symbol position along the predefined payline such that the predefined payline extends across the first and second special symbols.

15. The gaming machine of claim 12, the controller for assigning the same multiplier function value to each of the first special symbol and the second special symbol, and for providing an enhanced award to the player if the third game outcome includes a winning outcome including the first and second special symbols, the enhanced award being a function of the first special symbol multiplier function and the second special symbol multiplier function.

16. The gaming machine of claim 12, the controller for releasing the first and second special symbols in a subsequent forth game outcome if a third special symbol is not displayed in the third game outcome.

17. A gaming system, comprising:

a plurality of gaming devices, each gaming device including a user input device for accepting a player's selection input and a display device; and a system controller coupled to each gaming device of the plurality of gaming devices, the system controller for displaying, on at least one gaming device, a game including a plurality of symbols at a plurality of symbol positions, the plurality of symbols including a plurality of normal symbols and at least one special symbol, for receiving, from the at least one gaming device, a signal indicative of a wager on the game, for responsively generate an outcome of a first game and display the generated first game outcome on the at least one gaming device, for determining if a first special symbol is displayed in the generated first game outcome and responsively retaining the first special symbol during a subsequent second game, assigning a first multiplier function to the first special symbol, generating the second game outcome including the retained first special symbol, and for providing an enhanced award to the player if the second game outcome includes a winning outcome including the first special symbol, the enhanced award being a function of the first special symbol multiplier function, the system controller for determining if a second special symbol is displayed in the second game outcome and responsively releasing the retained first special symbol in a subsequent third game if the second special symbol does not appear in the second game outcome, and retaining the first and the second special symbols in the subsequent third game and assigning a second multiplier factor to the second special symbol if the second special symbol appears in the second game outcome.

18. The system of claim 17, the system controller for moving the first special symbol to a predefined symbol position, and for retaining the first special symbol in the predefined position and responsively randomly generating the subsequent second game outcome including the first special symbol being retained in the predefined symbol position.

19. The system of claim 17, the system controller for generating the subsequent third game outcome including the first special symbol and the second special symbol and providing another award to the player as a function of the third game outcome.

20. The system for claim 19, the system controller for releasing the first and second special symbols in a subsequent forth game outcome if a third special symbol is not displayed in the third game outcome.

* * * * *